United States Patent
McAuliffe et al.

(10) Patent No.: US 9,896,965 B2
(45) Date of Patent: Feb. 20, 2018

(54) THRUST BEARING ASSEMBLY WITH FLOW PATH RESTRICTION

(71) Applicant: Hamilton Sundstrand Corporation, Windsor Locks, CT (US)

(72) Inventors: Christopher McAuliffe, Windsor, CT (US); Craig M. Beers, Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 368 days.

(21) Appl. No.: 14/966,749

(22) Filed: Dec. 11, 2015

(65) Prior Publication Data

US 2017/0167293 A1    Jun. 15, 2017

(51) Int. Cl.
| | | |
|---|---|---|
| F16C 17/04 | (2006.01) | |
| F16C 37/00 | (2006.01) | |
| F01D 25/16 | (2006.01) | |
| F01D 25/24 | (2006.01) | |
| B64D 13/02 | (2006.01) | |
| F01D 5/02 | (2006.01) | |
| B64D 13/06 | (2006.01) | |
| B64D 13/08 | (2006.01) | |

(52) U.S. Cl.
CPC ............ F01D 25/16 (2013.01); F01D 5/02 (2013.01); F01D 25/24 (2013.01); F16C 17/04 (2013.01); F16C 37/00 (2013.01); B64D 13/02 (2013.01); B64D 13/08 (2013.01); B64D 2013/0648 (2013.01); F05D 2240/52 (2013.01); F16C 2326/43 (2013.01); F16C 2362/00 (2013.01)

(58) Field of Classification Search
CPC ........ F16C 17/04; F16C 37/00; F16C 37/002; F16C 2326/43; F16C 2362/52; F16C 33/664; F16C 33/6659; F01D 25/16; F01D 5/02; F01D 25/24; F05D 2240/52; B64D 13/02; B64D 13/08; B64D 2013/0648
USPC ........ 384/99, 100, 103, 104, 106, 109, 121, 384/125, 129; 415/104, 111, 229; 62/172, 192, 205, 401
See application file for complete search history.

(56) References Cited

U.S. PATENT DOCUMENTS 4,171,928 A * 10/1979 Emerson ................... F01D 3/00
                                                                    415/104
4,462,700 A *  7/1984 Agrawal ............... F16C 17/042
                                                                    384/105

(Continued)

FOREIGN PATENT DOCUMENTS

EP       0812996 A2    12/1997
EP       2187072 A1 *   5/2010   .............. F16C 17/03

(Continued)

OTHER PUBLICATIONS

Extended European Search Report for European Patent Application No. 16201619.0, dated Mar. 2, 2017, 7 pages.

Primary Examiner — Marcus Charles
(74) Attorney, Agent, or Firm — Kinney & Lange, P.A.

(57) ABSTRACT

A bearing assembly includes a shaft and a thrust runner attached to the shaft. The shaft runner protrudes radially outward from the shaft. A thrust bearing is positioned axially adjacent to the thrust runner. A first flow passage is between the thrust runner and a first face of the thrust bearing. A second flow passage is between a second face of the thrust bearing and a housing. A restriction feature restricts a flow of fluid through the second flow passage.

16 Claims, 5 Drawing Sheets

(56) References Cited

U.S. PATENT DOCUMENTS

| | | | | |
|---|---|---|---|---|
| 4,597,677 | A * | 7/1986 | Hagiwara | F16C 17/042 384/105 |
| 5,209,652 | A * | 5/1993 | Fischer | F04D 29/041 384/103 |
| 5,498,082 | A * | 3/1996 | Nadjafl | F16C 17/042 384/105 |
| 5,833,369 | A * | 11/1998 | Heshmat | F16C 17/042 384/105 |
| 5,918,985 | A * | 7/1999 | Bosley | F01D 25/168 384/105 |
| 5,938,341 | A * | 8/1999 | Eccles | F16C 27/08 384/105 |
| 6,286,303 | B1 | 9/2001 | Pfligler et al. | |
| 6,752,533 | B2 | 6/2004 | Saville et al. | |
| 7,497,627 | B2 * | 3/2009 | Saville | F16C 17/042 384/105 |
| 7,948,105 | B2 * | 5/2011 | Agrawal | F01D 15/005 290/52 |
| 8,147,143 | B2 * | 4/2012 | Struziak | F16C 17/042 384/103 |
| 2009/0304313 | A1 * | 12/2009 | Ertas | F16C 17/035 384/99 |
| 2011/0229313 | A1 | 9/2011 | Beers et al. | |
| 2015/0110621 | A1 | 4/2015 | Saville et al. | |
| 2016/0091016 | A1 | 3/2016 | Struziak et al. | |

FOREIGN PATENT DOCUMENTS

| | | |
|---|---|---|
| KR | 101303071 B1 | 9/2013 |
| WO | WO2004055398 A1 | 7/2004 |
| WO | WO2014/133499 A2 | 9/2014 |

\* cited by examiner

THRUST BEARING ASSEMBLY WITH FLOW PATH RESTRICTION

BACKGROUND

The present disclosure relates to rotary machines, and in particular, to a thrust bearing in an air cycle machine ("ACM").

ACMs are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressured air sufficiently that it must be cooled, even if the ambient air temperature is very low. Thus, under most conditions, heat must be removed from air by the ACM before the air is delivered to the aircraft cabin.

To condition the air as needed, ACMs include a fan section, a compressor section, and a turbine section that are all mounted on a common shaft. The compressor receives partially compressed air from the aircraft and further compresses the air. The compressed air then moves through a heat exchanger and is cooled by the fan section. The air then moves through the turbine section where it is expanded for use in the aircraft, for example, for use as cabin air. The turbine section also extracts energy from the air and uses the energy to drive the fan section and the compressor section via the common shaft.

ACMs also include bearings that are positioned around the common shaft. The bearings are cooled by passing a cooling air flow through a cavity that is adjacent the bearing. The cooling air flow then exits the cavity and is discharged from the ACM into an ambient environment. The cooling air flow is limited in that it can only cool the bearing using convective heat transfer. Increasing the service life of bearings in ACMs continues to be a goal of designers and manufacturers as failure of these bearings is one of the leading causes for ACM removals.

SUMMARY

A bearing assembly includes a shaft and a thrust runner attached to the shaft. The shaft runner protrudes radially outward from the shaft. A thrust bearing is positioned axially adjacent to the thrust runner. A first flow passage is between the thrust runner and a first face of the thrust bearing. A second flow passage is between a second face of the thrust bearing and a housing. A restriction feature restricts a flow of fluid through the second flow passage.

A method of cooling a thrust bearing includes passing a fluid across a thrust bearing through a first flow passage between a thrust runner and a first face of the thrust bearing. Fluid is also passed through a second flow passage between a second face of the thrust bearing and a housing. A flow of the fluid is restricted in the second flow passage at a point along an inner diameter of the thrust bearing. A portion of the flow of the fluid in the second passage is diverted to flow into the first flow passage. The thrust bearing is cooled with the flow of the fluid.

An ACM includes a housing and a thrust runner extending radially outward from a shaft located along a centerline axis of the housing. A thrust bearing is positioned between the housing and the thrust runner. The thrust bearing includes a main plate extending through the thrust bearing. A first flow passage extends along a first face of the thrust bearing. A second flow passage extends between a second face of the thrust bearing and a housing, with the second face being opposite the first face. A restriction feature extends from the housing in an axial direction towards the thrust bearing.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Figure 1:
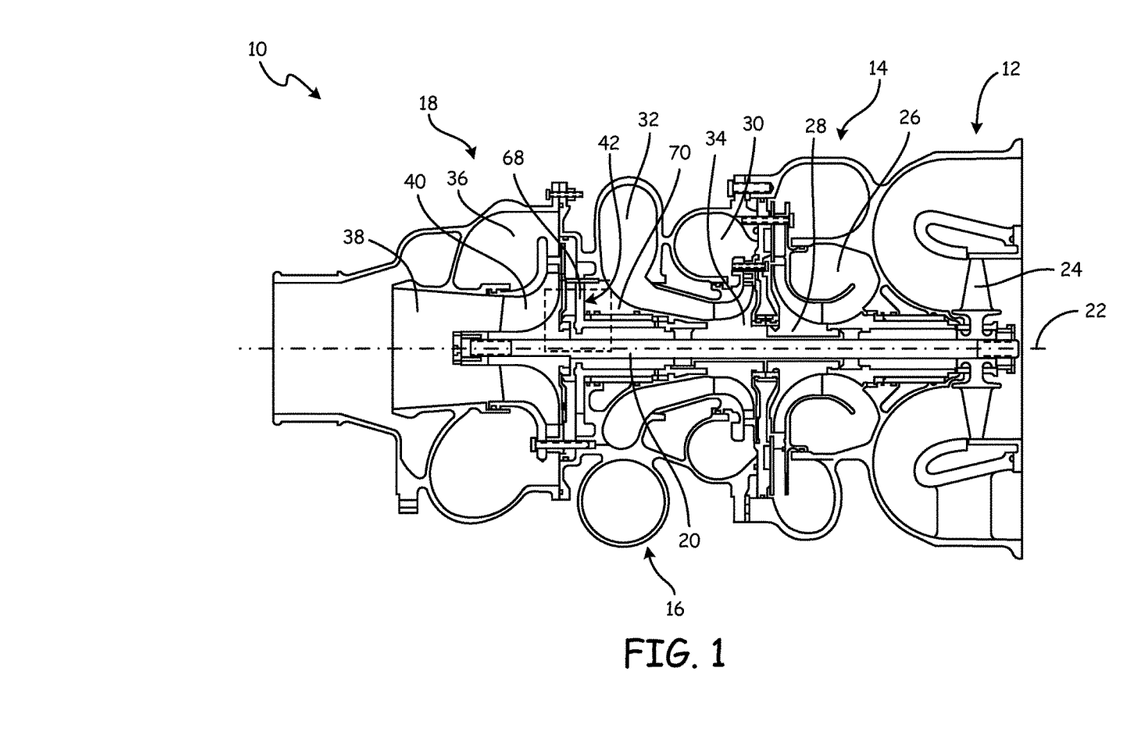
FIG. 1 is a cross-sectional view of an ACM.

FIG. 1 is a cross-sectional view of ACM 10, which includes fan section 12, compressor section 14, and first stage turbine section 16. Shaft 20 rotates around central axis 22. Fan section 12 includes fan blades 24. Compressor section 14 includes compressor outlet 26 and compressor nozzle 28. First stage turbine section 16 includes turbine inlet 30, turbine outlet 32, and turbine nozzle 34. FIG. 1 also shows housing 70, which is discussed with respect to FIGS. 3A-3C as 70A, 70B, and 70C.

Fan section 12 is mounted on shaft 20. Fan blades 24 rotate around shaft 20. Fan section 12 is typically used to draw in air from an associated gas turbine engine or other aircraft component.

Compressor section 14 is mounted on shaft 20. Compressor outlet 26 is a duct through which air can be routed to other systems after it has been compressed in compressor section 14. Compressor nozzle 28 rotates within in compressor section 14. In particular, compressor nozzle 28 is a rotor or impeller.

First stage turbine section 16 includes turbine inlet 30, turbine outlet 32, and turbine nozzle 34. First stage turbine section 16 is mounted on shaft 20. Turbine inlet 30 is a duct through which air passes prior to expansion in first stage turbine section 16. Turbine outlet 32 is a duct through which air can be routed after it has been expanded to be used in other areas on an aircraft. For example, air can be routed out of turbine outlet 32 and into a cabin for use as cabin air. Turbine nozzle 34 is a nozzle section that extracts energy from air passing through first stage turbine section 16. In particular, turbine nozzle 34 is a rotor or impeller. Air passing through first stage turbine section 16 drives the rotation of first stage turbine section 16 and any attached components, including shaft 20, fan section 12, and compressor section 14.

Similarly, second stage turbine section 18 includes turbine inlet 36, turbine outlet 38, and turbine nozzle 40. Second stage turbine section 18 is mounted on shaft 20. Turbine inlet 36 is a duct through which air passes prior to expansion in second stage turbine section 18. Turbine outlet 38 is a duct through which air can be routed after it has been expanded to be used in other areas on an aircraft. For example, air can be routed out of turbine outlet 38 and into a cabin for use as cabin air. Turbine nozzle 40 is a nozzle section that extracts energy from air passing through second stage turbine section 18. In particular, turbine nozzle 40 is a rotor or impeller. Air passing through second stage turbine section 18 drives the rotation of second stage turbine section 18 and any attached components, including shaft 20, fan section 12, and compressor section 14.

Shaft 20 is a rod, such as a titanium tie-rod, used to connect other components of ACM 10. Central axis 22 is an axis with respect to which other components can be arranged.

Air is received in compressor section 14. The air can be ram air from a ram air scoop or the air can be pulled into ACM 10 using fan section 12 from an associated gas turbine or other aircraft component. The air passes through compressor section 14 where it is compressed with compressor nozzle 28 and then discharged out of compressor outlet 26. From compressor outlet 26, the air is then routed into turbine inlet 30. The air expands as it passes through first stage turbine section 16 and it drives turbine nozzle 34 before it is discharged out of turbine outlet 32. Air that is discharged out of turbine outlet 32 can then be routed to other parts of the aircraft, for example, for use as cabin air.

Bearing assembly 42 is positioned between first stage turbine section 16 and second stage turbine section 18. Bearing assembly 42 includes foil thrust bearing 44, which is shown in isolation in FIG. 2. Generally, thrust bearings rely on relative rotation between a shaft, typically referred to as the thrust runner, and a bearing to generate a non-linear fluid film between the thrust runner and the bearing. The fluid film forms when the relative rotation of the shaft and bearing interacts with the fluid to create and maintain pressurized wedges of fluid between the shaft and bearing. The pressurized fluid wedge transfers thrust or axial loads from the thrust runner to the bearing, the fluid typically being air or oil. Thrust bearings typically consist of a plurality of bearing foils, also referred to as top foils, and a plurality of bump foils. In a typical arrangement, the plurality of bearing foils and bump foils are welded to the same side of an annular plate, the assembly forming a thrust bearing.

Figure 2:
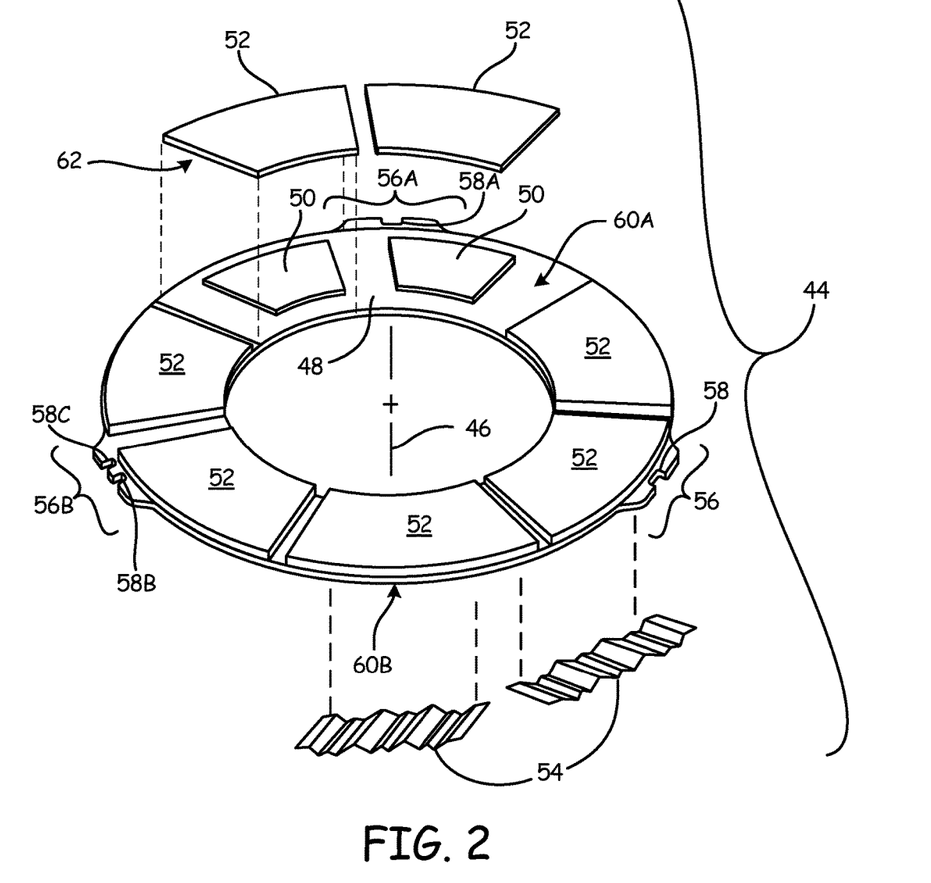
FIG. 2 is an exploded perspective view of a thrust bearing of the ACM.

FIG. 2 is an exploded perspective view of foil thrust bearing 44 having axis 46 passing through a geometric center. Foil thrust bearing 44 includes a portion of bearing assembly 42 from FIG. 1. Axis 46 defines a frame of reference in which an axial direction is parallel with axis 46, a radial direction is perpendicular to axis 46, and a circumferential direction corresponds to an angular direction about axis 46. Foil thrust bearing 44 includes main plate 48, spacers 50, bearing foils 52, and bump foils 54. Main plate 48 further includes attachment tabs 56, 56a, and 56b and slots 58, 58a, 58b, and 58c. Main plate 48 provides a structure for mounting spacers 50, bearing foils 52, and bump foils 54. Main plate 48 can be annular in shape.

In general, bearing foils 52 and bump foils 54 attach to opposite faces 60a and 60b of main plate 48, and spacers 50 are arranged between bearing foils 52 and main plate 48. Bearing foils 52 are provided with clearance between main plate 48 and the outermost face of bearing foils 52 along radially-extending edge 62 to facilitate attachment of bearing foils 52 to main plate 48. Bearing foils 52 have clearance between adjacent bearing foils 52 that, in some embodiments, is approximate equal to 0.050 inches (0.127 centimeters). Bump foils 54 are corrugated. Spacers 50 can be separate components attached to main plate 48 or be integrally formed with main plate 48. In either case, spacers 50 can be shaped to support bearing foils 52 in a manner beneficial to the formation of a hydrodynamic fluid film during the operation of foil thrust bearing 44. For example, spacers 50 can have a generally flat shape that cooperates with bearing foils 52 and bump foils 54 to promote hydrodynamic wedge formation. Foil thrust bearing 44, bearing foils 52, and bump foils 54 can include a variety of materials such as nickel-based superalloys and other metal alloys. Foil thrust bearing 44, bearing foils 52, and bump foils 54 can also include low friction coatings such as polytetrafluoroethylene.

In the embodiment shown in FIG. 2, foil thrust bearing 44 has seven spacers 50, seven bearing foils 52, and seven bump foils 54. The number of spacers 50, bearing foils 52, and bump foils 54 depend on the size of the bearing and the particular load requirements of the bearing application; however, an odd number for each can be advantageous for detuning the bearing components from natural frequency harmonics of the rotating machine. Higher loads or larger size requirements increase the required bearing area of foil thrust bearing 44. As the bearing area increases, the number of spacers 50, bearing foils 52, and bump foils 54 typically increase in order to limit the portion of the load resisted by any single group of components. In other applications, size limitations can require the number of components to be reduced. Therefore, it will be appreciated by one skilled in the art that the present invention would apply to other thrust bearings having more or less spacers 50, bearing foils 52, and bump foils 54.

Bump foils 54 are in contact with bearing foils 52. Bearing foils 52 support the air film which carried the thrust load generated by ACM 10. Heat from the power loss of foil thrust bearing 44 (which can be more than 1 horsepower) is dumped into thrust runner 68 (depicted in FIGS. 3A, 3B, and 3C as 68A, 68B, and 68C respectively) and bearing foils 52. Cooling flow directed through foil thrust bearing 44 carries off the heat to minimize thermal distortion of thrust runner 68 and bearing foils 52 which can impair bearing capacity. Some of the cooling flow directed through foil thrust bearing 44 passes through a secondary set of bump foils. Although there is a cooling benefit to this secondary airflow it is not as effective as the cooling flow directed through bearing foils 52.

Figure 3A:
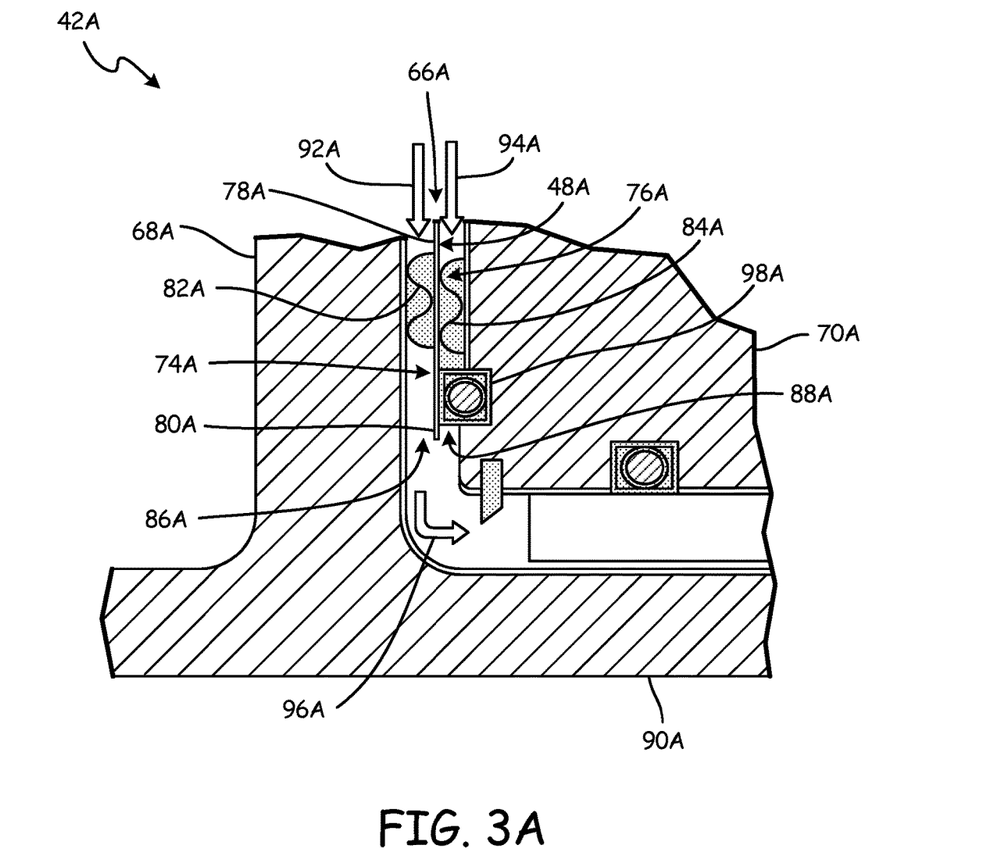
FIG. 3A is a cross-sectional view of a bearing assembly of the ACM according to one embodiment of the present disclosure.

FIG. 3A is a cross-sectional view of bearing assembly 42A of ACM 10 according to one embodiment. Bearing assembly 42A includes thrust bearing 66A, thrust runner 68A, and housing 70A. Thrust bearing 66A is positioned between thrust runner 68A and housing 70A. Thrust bearing 66A includes main plate 48A with first face 74A and second face 76A positioned on an opposite side of main plate 48A from first face 74A. Main plate 48A also includes outer diameter edge 78A and inner diameter edge 80A. First face 74A includes first foil 82A and second face 76A includes second foil 84A. First flow passage 86A passes between thrust runner 68A and main plate 48A. Second flow passage 88A passes between main plate 48A and housing 70A.

Thrust runner 68A is connected to shaft 90A which rotates about a center axis of ACM 10 during operation. Furthermore, thrust runner 68A rotates relative to thrust bearing 66A during operation.

First foil 82A supports an air film which carries a thrust load generated by ACM 10. Thermal energy from power loss of thrust bearing 66A (which can be more than 1 horsepower) is transferred to thrust runner 68A and first foil 82A. Primary fluid flow 92A is directed through first flow passage 86A to transfer thermal energy away from thrust runner 68A and thrust bearing 66A to minimize thermal distortion of thrust runner 68A and first foil 82A which can impair bearing capacity and overall bearing performance. Additionally, secondary fluid flow 94A is directed through second flow passage 88A to draw an additional amount of thermal energy from thrust bearing 66A. Although there is a cooling benefit to this secondary fluid flow 94A, secondary fluid flow 94A is not as effective at thermal energy transfer as primary fluid flow 92A through first flow passage 86A. After passing through thrust bearing 66A, primary fluid flow 92A and secondary fluid flow 94A combine to form cooling flow exhaust 96A which flows out of bearing assembly 42A.

Secondary fluid flow 94A is not as effective because it is not directly flowing past first foil 82A which is heated during use. Primary fluid flow 92A flows directly along a backside of first foil 82A. However, for second flow passage 88A to remove thermal energy, the thermal energy must first be transferred from first foil 82A to second foil 84A, and then secondary fluid flow 94A removes the thermal energy transferred to second foil 84A. The greater thermal resistance encountered by secondary fluid flow 94A makes secondary fluid flow 94A less effective than primary fluid flow 92A.

Bearing assembly 42A also includes restriction element 98A. Restriction element 98A is in contact with main plate 48A. Restriction element 98A forms a seal positioned between housing 70A and main plate 48A. Restriction element 98A can include an O-ring or other type of seal. Restriction element 98A prevents the secondary fluid flow 94A from passing inner diameter edge 80A of main plate 48A. With secondary fluid flow 94A being prevented from passing inner diameter edge 80A of main plate 48A, a back pressure is created in second flow passage 88A which diverts secondary fluid flow 94A to combine with primary fluid flow 92A, e.g. at or near outer diameter edge 78A of main plate 48A, to form cooling flow exhaust 96A and pass through first flow passage 86A.

Redirecting secondary fluid flow 94A into first flow passage increases the overall cooling effectiveness and improved cooling capacity for the same amount of total bearing cooling fluid flow. Because the overall cooling fluid flow across thrust bearing 66A is metered by downstream shaft orifices, the overall fluid flow rate across thrust bearing 66A is relatively unchanged while the flow through first flow passage 86A is as much as doubled.

Bearing assembly 42A also provides several advantages for ACM 10. First, bearing assembly 42A makes ACM 10 more effective, as less cooling air flow is needed to cool thrust bearing 66A. This means less cooling air flow needs to be routed away from the main flow path through ACM 10, thus improving the overall efficiency of ACM 10. The improved efficiency and effectiveness of ACM 10 with bearing assembly 42A outweighs any concerns about the weight or cost of adding restriction element 98A to ACM 10. Bearing assembly 42A greatly improves the thermodynamic performance of air that is flowing through ACM 10.

Figure 3B:
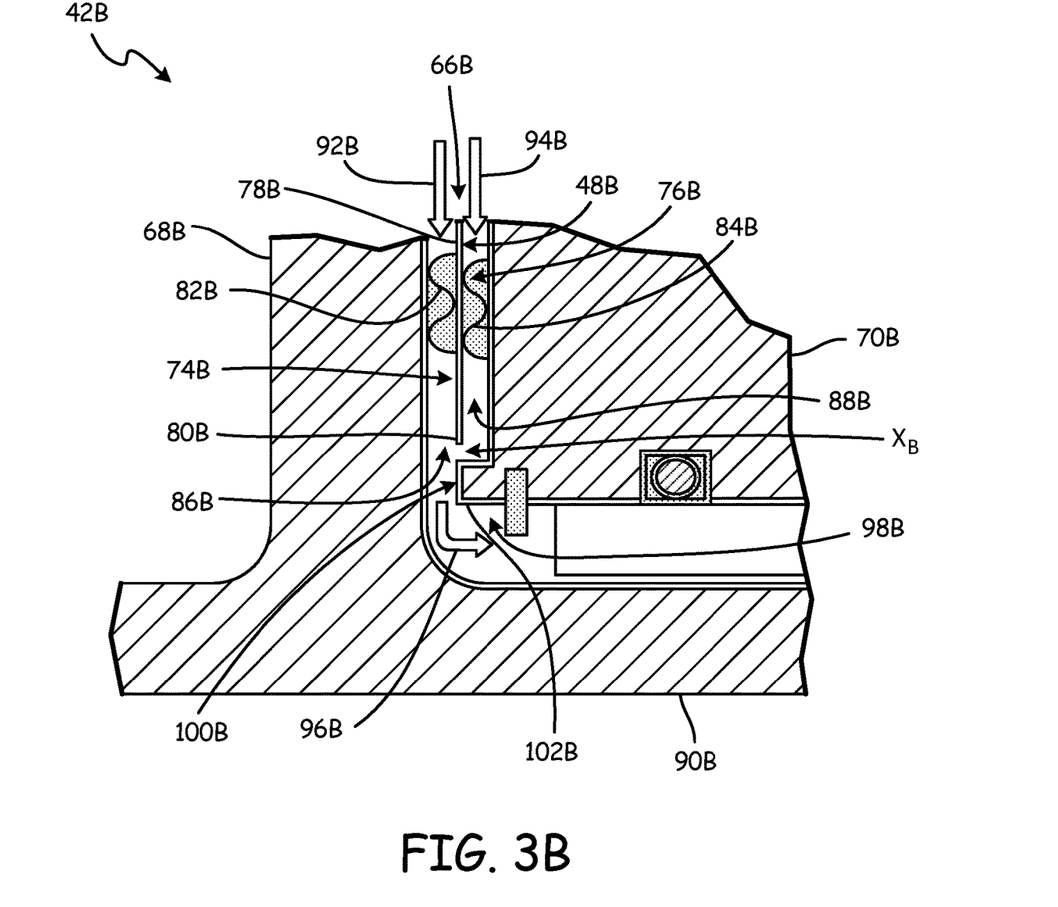
FIG. 3B is a cross-sectional view of a bearing assembly of the ACM according to another embodiment of the present disclosure.

FIG. 3B is a cross-sectional view of bearing assembly 42B of ACM 10 according to another embodiment. Bearing assembly 42B includes thrust bearing 66B, thrust runner 68B, and housing 70B. Thrust bearing 66B is positioned between thrust runner 68B and housing 70B. Thrust bearing 66B includes main plate 48B with first face 74B and second face 76B positioned on an opposite side of main plate 48B from first face 74B. Main plate 48B also includes outer diameter edge 78B and inner diameter edge 80B. First face 74B includes first foil 82B and second face 76B includes second foil 84B. First flow passage 86B passes between thrust runner 68B and main plate 48B. Second flow passage 88B passes between main plate 48B and housing 70B.

Thrust runner 68B is connected to shaft 90B which rotates about a center axis of ACM 10 during operation. Furthermore, thrust runner 68B rotates relative to thrust bearing 66B during operation.

First foil 82B supports an air film which carries a thrust load generated by ACM 10. Thermal energy from power loss of thrust bearing 66B (which can be more than 1 horsepower) is transferred to thrust runner 68B and first foil 82B. Primary fluid flow 92B is directed through first flow passage 86B to transfer thermal energy away from thrust runner 68B and thrust bearing 66B to minimize thermal distortion of thrust runner 68B and first foil 82B which can impair bearing capacity and overall bearing performance. Additionally, secondary fluid flow 94B is directed through second flow passage 88B to draw an additional amount of thermal energy from thrust bearing 66B. After passing through thrust bearing 66B, primary fluid flow 92B and secondary fluid flow 94B combine to form cooling flow exhaust 96B which flows out of bearing assembly 42B.

Restriction element 98B of bearing assembly 42B includes lip 100B extending from housing 70B in an axial direction towards main plate 48B. Distal end 102B of lip 100B is positioned radially inward from inner diameter edge 80B of main plate 48B. Distal end 102B can be aligned in radial direction with main plate 48B. Spacing $X_B$ between distal end 102B and inner diameter edge 80B of main plate 48B in a radial direction can be between 0.002 and 0.020 inches (0.005 and 0.051 cm).

Restriction element 98B creates a more constricted exit area from second flow passage 86B than a prior art secondary flow passage without a restriction element. Restriction element 98B reduces secondary fluid flow 94B through second flow passage 88B by up to, and in some instances greater than, 90%. In other words, restriction element 98B reduces secondary fluid flow 94B to 10% of what the fluid flow would be in the absence of restriction element 98B. Restriction element 98B can also reduce secondary fluid flow 94B to an amount 90% less than primary fluid flow 92B.

Figure 3C:
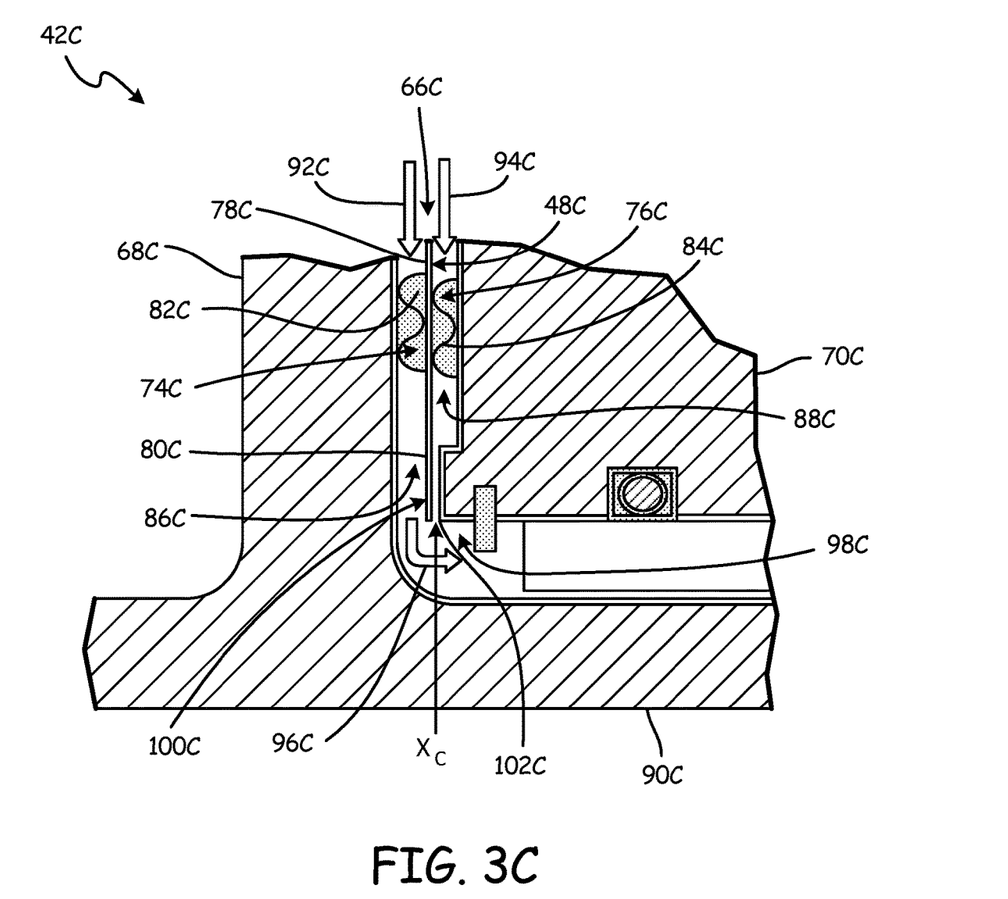
FIG. 3C is a cross-sectional view of a bearing assembly of the ACM according to yet another embodiment of the present disclosure.

FIG. 3C is a cross-sectional view of bearing assembly 42C of ACM 10 according to another embodiment. Bearing assembly 42C includes thrust bearing 66C, thrust runner 68C, and housing 70C. Thrust bearing 66C is positioned between thrust runner 68C and housing 70C. Thrust bearing 66C includes main plate 48C with first face 74C and second face 76C positioned on an opposite side of main plate 48C from first face 74C. Main plate 48C also includes outer diameter edge 78C and inner diameter edge 80C. First face 74C includes first foil 82C and second face 76C includes second foil 84C. First flow passage 86C passes between thrust runner 68C and main plate 48C. Second flow passage 88C passes between main plate 48C and housing 70C.

Thrust runner 68C is connected to shaft 90C which rotates about a center axis of ACM 10 during operation. Furthermore, thrust runner 68C rotates relative to thrust bearing 66C during operation.

First foil 82C supports an air film which carries a thrust load generated by ACM 10. Thermal energy from power loss of thrust bearing 66C (which can be more than 1 horsepower) is transferred to thrust runner 68C and first foil 82C. Primary fluid flow 92C is directed through first flow passage 86C to transfer thermal energy away from thrust runner 68C and thrust bearing 66C to minimize thermal distortion of thrust runner 68C and first foil 82C which can impair bearing capacity and overall bearing performance. Additionally, secondary fluid flow 94C is directed through second flow passage 88C to draw an additional amount of thermal energy from thrust bearing 66C. After passing through thrust bearing 66C, primary fluid flow 92C and secondary fluid flow 94C combine to form cooling flow exhaust 96C which flows out of bearing assembly 42C.

Restriction element 98C of bearing assembly 42C includes lip 100C extending from housing 70C in an axial direction towards main plate 48C. Distal end 102C of lip 100C can be aligned in an axial direction with inner diameter edge 80C of main plate 48C. Spacing $X_C$ between distal end 102C and inner diameter edge 80C of main plate 48C in an axial direction can be between 0.002 and 0.020 inches (0.005 and 0.051 cm).

Restriction element 98C creates a more constricted exit from second flow passage 86C than a prior art secondary flow passage without a restriction element. Restriction element 98C reduces secondary fluid flow 94C through second flow passage 88C by up to, and in some instances greater than, 90%. In other words, restriction element 98C reduces secondary fluid flow 94C to 10% of what the fluid flow would be in the absence of restriction element 98C. Restriction element 98C can also reduce secondary fluid flow 94C to an amount 90% less than primary fluid flow 92C.

Generally, restriction elements 98A, 98B, and 98C cause a flow area of second flow passages 88A, 88B, and 88C to be locally reduced, thereby creating an at least partial seal that redirects secondary fluid flows 94A, 94B, and 94C due to back pressure formed in second flow passages 88A, 88B, and 88C.

Discussion of Possible Embodiments

The following are non-exclusive descriptions of possible embodiments of the present invention.

A bearing assembly can include a shaft and a thrust runner attached to the shaft. The shaft runner can protrude radially outward from the shaft. A thrust bearing can be positioned axially adjacent to the thrust runner. A first flow passage can be between the thrust runner and a first face of the thrust bearing. A second flow passage can be between a second face of the thrust bearing and a housing. A restriction feature can restrict a flow of fluid through the second flow passage.

The bearing assembly of the preceding paragraph can optionally include, additionally and/or alternatively, any one or more of the following features, configurations and/or additional components:

a further embodiment of the foregoing bearing assembly, wherein the thrust bearing may comprise a main plate with an annular shape and that can be located between the first and second faces of the thrust bearing, wherein the main plate can include an outer diameter edge and an inner diameter edge;

a further embodiment of any of the foregoing bearing assemblies, wherein the first face of the thrust bearing can comprise a first plurality of top foils, a first plurality of bottom foils, and further wherein the second face of the thrust bearing can comprise a second plurality of top foils and a second plurality of bottom foils;

a further embodiment of any of the foregoing bearing assemblies, wherein the restriction feature can comprise a lip extending towards the second face of the thrust bearing in an axial direction;

a further embodiment of any of the foregoing bearing assemblies, wherein a distal end of the lip is can be positioned radially inward from the main plate inner diameter edge and in radial alignment with the main plate of the thrust bearing;

a further embodiment of any of the foregoing bearing assemblies, wherein a distal end of the lip can be positioned in axial alignment with the main plate inner diameter edge;

a further embodiment of any of the foregoing bearing assemblies, wherein the restriction feature can further comprise an O-ring positioned between a second face of the thrust bearing and a housing; and/or a further embodiment of any of the foregoing bearing assemblies, wherein the O-ring can be positioned in axial alignment with the main plate inner diameter edge, and further wherein the O-ring can be in contact with the main plate.

A method of cooling a thrust bearing can include passing a fluid across a thrust bearing through a first flow passage between a thrust runner and a first face of the thrust bearing. Fluid can be passed through a second flow passage between a second face of the thrust bearing and a housing. A flow of the fluid can be restricted in the second flow passage at a point along an inner diameter of the thrust bearing. A portion of the flow of the fluid in the second passage can be diverted to flow into the first flow passage. The thrust bearing can be cooled with the flow of the fluid.

The method of the preceding paragraph can optionally include, additionally and/or alternatively, any one or more of the following features, configurations and/or additional components:

a further embodiment of the foregoing method can further comprise positioning the thrust bearing axially adjacent the thrust runner;

a further embodiment of any of the foregoing methods, wherein restricting a flow of air in the second flow passage further can include positioning a restriction feature along the thrust bearing; and/or a further embodiment of any of the foregoing methods, wherein diverting a portion of the flow of the fluid in the second passage can further comprise creating a back pressure in the second passage.

An ACM can include a housing and a thrust runner extending radially outward from a shaft located along a centerline axis of the housing. A thrust bearing can be positioned between the housing and the thrust runner. The thrust bearing can include a main plate extending through the thrust bearing. A first flow passage can along through a first face of the thrust bearing. A second flow passage can extend between a second face of the thrust bearing and a housing, with the second face being opposite the first face. A restriction feature can extend from the housing in an axial direction towards the thrust bearing.

The ACM of the preceding paragraph can optionally include, additionally and/or alternatively, any one or more of the following features, configurations and/or additional components:

a further embodiment of the foregoing ACM, wherein the main plate can comprise an annular shape and can be located between the first and second faces of the thrust bearing, wherein the main plate can include an outer diameter edge and an inner diameter edge;

a further embodiment of any of the foregoing ACMs, wherein the first face of the thrust bearing can comprise a first plurality of top foils and a first plurality of bottom foils, and further wherein the second face of the thrust bearing can comprise a second plurality of top foils and a second plurality of bottom foils;

a further embodiment of any of the foregoing ACMs, wherein the restriction feature can comprise a lip extending from the housing in an axial direction;

a further embodiment of any of the foregoing ACMs, wherein a distal end of the lip can be positioned radially inward from the main plate inner diameter edge and in radial alignment with the main plate of the thrust bearing;

a further embodiment of any of the foregoing ACMs, wherein a distal end of the lip can be positioned in axial alignment with the main plate inner diameter edge;

a further embodiment of any of the foregoing ACMs, wherein the restriction feature can further comprise an O-ring positioned between the housing and the second face of the thrust bearing; and/or a further embodiment of any of the foregoing ACMs, wherein the O-ring can be positioned in axial alignment with the main plate inner diameter edge, and further wherein the O-ring is in contact with the main plate.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bearing assembly comprising:
a shaft;
a thrust runner attached to the shaft, wherein the thrust runner protrudes radially outward from the shaft;
a thrust bearing positioned axially adjacent the thrust runner, wherein the thrust bearing comprises:
a main plate with an annular shape and that is located between first and second faces of the thrust bearing, wherein the main plate includes an outer diameter edge and an inner diameter edge;
a first flow passage between the thrust runner and a first face of the thrust bearing;
a second flow passage between a second face of the thrust bearing and a housing; and
a restriction feature that restricts a flow of fluid through the second flow passage,
wherein the restriction feature comprises an O-ring positioned between the second face of the thrust bearing and the housing.

2. The bearing assembly of claim 1, wherein the first face of the thrust bearing comprises:
a first plurality of top foils; and
a first plurality of bottom foils;
and further wherein the second face of the thrust bearing comprises:
a second plurality of top foils; and
a second plurality of bottom foils.

3. The bearing assembly of claim 1, wherein the restriction feature comprises a lip extending towards the second face of the thrust bearing in an axial direction.

4. The bearing assembly of claim 1, wherein the O-ring is positioned in axial alignment with the main plate inner diameter edge, and further wherein the O-ring is in contact with the main plate.

5. A method of cooling the thrust bearing of claim 1, the method comprising:
passing a fluid across the thrust bearing through the first flow passage and through the second flow passage;
restricting a flow of the fluid in the second flow passage at a point along the inner diameter edge of the main plate;
diverting a portion of the flow of the fluid in the second passage to flow into the first flow passage; and
cooling the thrust bearing with the flow of the fluid.

6. The method of claim 5 further comprising positioning the thrust bearing axially adjacent the thrust runner.

7. The method of claim 5, wherein restricting a flow of air in the second flow passage further includes positioning the restriction feature along the thrust bearing.

8. The method of claim 5, wherein diverting a portion of the flow of the fluid in the second passage further comprises creating a back pressure in the second passage.

9. A bearing assembly comprising:
a shaft;
a thrust runner attached to the shaft, wherein the thrust runner protrudes radially outward from the shaft;
a thrust bearing positioned axially adjacent the thrust runner, wherein the thrust bearing comprises:
a main plate with an annular shape and that is located between first and second faces of the thrust bearing, wherein the main plate includes an outer diameter edge and an inner diameter edge;
a first flow passage between the thrust runner and a first face of the thrust bearing;
a second flow passge between a second face of the thrust bearing and a housing; and
a restriction feature that restricts a flow of fluid through the second flow passage, wherein the restriction feature comprises a lip extending towards the second face of the thrust bearing in an axial direction, wherein a distal end of the lip is positioned in axial alignment with the main plate inner diameter edge, or radially inward from the main plate inner diameter edge and in radial alignment with the main plate of the thrust bearing.

10. An air cycle machine comprising:
a housing;
a thrust runner extending radially outward from a shaft located along a centerline axis of the housing;
a thrust bearing positioned between the housing and the thrust runner, wherein the thrust bearing comprises a main plate extending through the thrust bearing;
a first flow passage extending along a first face of the thrust bearing;
a second flow passage extending between a second face of the thrust bearing and a housing, wherein the second face is opposite the first face; and
a restriction feature extending from the housing in an axial direction towards the thrust bearing, wherein the restriction feature comprises an O-ring positioned between the housing and the second face of the thrust bearing.

11. The air cycle machine of claim 10, wherein the main plate comprises an annular shape and is located between first and second faces of the thrust bearing, wherein the main plate includes an outer diameter edge and an inner diameter edge.

12. The air cycle machine of claim 10, wherein the first face of the thrust bearing comprises a first plurality of top foils and a first plurality of bottom foils, and further wherein the second face of the thrust bearing comprises a second plurality of top foils and a second plurality of bottom foils.

13. The air cycle machine of claim 10, wherein the O-ring is positioned in axial alignment with the main plate inner diameter edge, and further wherein the O-ring is in contact with the main plate.

14. An air cycle machine comprising:
   a housing;
   a thrust runner extending radially outward from a shaft located along a centerline axis of the housing;
   a thrust bearing positioned between the housing and the thrust runner, wherein the thrust bearing comprises a main plate extending through the thrust bearing;
   a first flow passage extending along a first face of the thrust bearing;
   a second flow passage extending between a second face of the thrust bearing and a housing, wherein the second face is opposite the first face; and
   a restriction feature extending from the housing in an axial direction towards the thrust bearing, wherein the restriction feature comprises a lip extending from the housing in an axial direction.

15. The air cycle machine of claim 14, wherein a distal end of the lip is positioned radially inward from the main plate inner diameter edge and in radial alignment with the main plate of the thrust bearing.

16. The air cycle machine of claim 14, wherein a distal end of the lip is positioned in axial alignment with the main plate inner diameter edge.

* * * * *

UNITED STATES PATENT AND TRADEMARK OFFICE
CERTIFICATE OF CORRECTION

| | |
|---|---|
| PATENT NO. | : 9,896,965 B2 |
| APPLICATION NO. | : 14/966749 |
| DATED | : February 20, 2018 |
| INVENTOR(S) | : Christopher McAuliffe and Craig M. Beers |

It is certified that error appears in the above-identified patent and that said Letters Patent is hereby corrected as shown below:

In the Claims

Column 10, Line 44:
Delete "passge"
Insert --passage--

Signed and Sealed this
Twenty-seventh Day of March, 2018

Andrei Iancu
*Director of the United States Patent and Trademark Office*